United States Patent
Mhatre et al.

(10) Patent No.: US 10,050,985 B2
(45) Date of Patent: Aug. 14, 2018

(54) SYSTEM FOR IMPLEMENTING THREAT DETECTION USING THREAT AND RISK ASSESSMENT OF ASSET-ACTOR INTERACTIONS

(71) Applicant: Vectra Networks, Inc., San Jose, CA (US)

(72) Inventors: Himanshu Mhatre, Mountain View, CA (US); David Lopes Pegna, San Carlos, CA (US); Oliver Brdiczka, Mountain View, CA (US)

(73) Assignee: Vectra Networks, Inc., San Jose, CA (US)

( * ) Notice: Subject to any disclaimer, the term of this patent is extended or adjusted under 35 U.S.C. 154(b) by 2 days.

(21) Appl. No.: 14/930,368

(22) Filed: Nov. 2, 2015

(65) Prior Publication Data

US 2016/0191559 A1   Jun. 30, 2016

Related U.S. Application Data

(60) Provisional application No. 62/074,602, filed on Nov. 3, 2014.

(51) Int. Cl.

| | |
|---|---|
| *H04L 29/06* | (2006.01) |
| *G06F 12/14* | (2006.01) |
| *G06F 11/00* | (2006.01) |
| *G06F 21/55* | (2013.01) |
| *H04L 29/08* | (2006.01) |
| *G06F 21/56* | (2013.01) |
| *G06F 21/62* | (2013.01) |

(52) U.S. Cl.
CPC .......... *H04L 63/1425* (2013.01); *G06F 11/00* (2013.01); *G06F 12/14* (2013.01); *G06F 21/552* (2013.01); *H04L 63/1416* (2013.01); *G06F 21/566* (2013.01); *G06F 21/6245* (2013.01); *H04L 67/30* (2013.01)

(58) Field of Classification Search
CPC ............. H04L 63/1416; H04L 63/1425; H04L 63/1433; H04L 63/145; G06F 21/577; G06F 21/552; G06F 12/14
USPC ....................................... 726/22–25; 709/224
See application file for complete search history.

(56) References Cited

U.S. PATENT DOCUMENTS

| | | | |
|---|---|---|---|
| 6,678,730 B2 * | 1/2004 | Hellerstein | H04L 12/2602 709/224 |
| 7,890,627 B1 * | 2/2011 | Thomas | G06Q 10/107 709/206 |

(Continued)

FOREIGN PATENT DOCUMENTS

| | | |
|---|---|---|
| EP | 2385471 A1 | 11/2011 |
| EP | 2908495 A1 | 8/2015 |

OTHER PUBLICATIONS

International Search Report and Written Opinion dated Feb. 23, 2016 for PCT Appln. No. PCT/US15/58684.

(Continued)

*Primary Examiner* — Hosuk Song
(74) *Attorney, Agent, or Firm* — Vista IP Law Group, LLP

(57) ABSTRACT

Disclosed is an approach to detect insider threats, by tracking unusual access activity for a specific user or computer with regard to accessing key assets over time. In this way, malicious activity and the different preparation phases of attacks can be identified.

27 Claims, 10 Drawing Sheets

(56) References Cited

U.S. PATENT DOCUMENTS

| | | | |
|---|---|---|---|
| 8,015,133 B1* | 9/2011 | Wu | H04L 63/1416 |
| | | | 706/21 |
| 8,266,687 B2* | 9/2012 | Baldry | G06F 21/6218 |
| | | | 709/224 |
| 8,607,340 B2* | 12/2013 | Wright | G06F 21/552 |
| | | | 726/22 |
| 8,776,218 B2* | 7/2014 | Wright | G06F 11/28 |
| | | | 726/22 |
| 8,800,044 B2* | 8/2014 | Raad | H04L 61/1511 |
| | | | 370/252 |
| 8,826,430 B2 | 9/2014 | Brdiczka et al. | |
| 8,832,828 B2* | 9/2014 | Lyne | G06F 21/55 |
| | | | 713/193 |
| 8,880,530 B2 | 11/2014 | Brdiczka et al. | |
| 8,983,826 B2 | 3/2015 | Brdiczka et al. | |
| 9,002,370 B2 | 4/2015 | Brdiczka et al. | |
| 9,509,794 B2 | 11/2016 | Hussain et al. | |
| 2005/0234920 A1 | 10/2005 | Rhodes et al. | |
| 2005/0281291 A1 | 12/2005 | Stolfo et al. | |
| 2010/0274744 A1 | 10/2010 | Brdiczka et al. | |
| 2011/0125547 A1 | 5/2011 | Brdiczka et al. | |
| 2011/0125679 A1 | 5/2011 | Brdiczka | |
| 2011/0126050 A1 | 5/2011 | Begole et al. | |
| 2011/0219315 A1 | 9/2011 | Bier et al. | |
| 2011/0258181 A1 | 10/2011 | Brdiczka et al. | |
| 2011/0258193 A1 | 10/2011 | Brdiczka et al. | |
| 2011/0302169 A1 | 12/2011 | Brdiczka et al. | |
| 2012/0136812 A1 | 5/2012 | Brdiczka | |
| 2012/0137367 A1 | 5/2012 | Dupont et al. | |
| 2012/0254165 A1 | 10/2012 | Brdiczka et al. | |
| 2013/0006678 A1 | 1/2013 | Bellotti et al. | |
| 2013/0091226 A1 | 4/2013 | Brdiczka | |
| 2013/0155068 A1 | 6/2013 | Bier et al. | |
| 2013/0289939 A1 | 10/2013 | Brdiczka | |
| 2014/0067455 A1 | 3/2014 | Zhang et al. | |
| 2014/0100952 A1 | 4/2014 | Bart et al. | |
| 2014/0122383 A1 | 5/2014 | Shen et al. | |
| 2014/0122483 A1 | 5/2014 | Zhang et al. | |
| 2014/0163934 A1 | 6/2014 | Zhang et al. | |
| 2014/0165195 A1 | 6/2014 | Brdiczka et al. | |
| 2014/0181968 A1 | 6/2014 | Ge et al. | |
| 2014/0201836 A1 | 7/2014 | Amsler | |
| 2014/0278729 A1 | 9/2014 | Liu et al. | |
| 2014/0317030 A1 | 10/2014 | Shen et al. | |
| 2014/0324751 A1 | 10/2014 | Roberts et al. | |
| 2014/0344174 A1 | 11/2014 | Ruan et al. | |
| 2014/0372753 A1 | 12/2014 | DeCristofaro et al. | |
| 2015/0120453 A1 | 4/2015 | Lee et al. | |
| 2015/0149390 A1 | 5/2015 | Brdiczka et al. | |
| 2015/0161670 A1 | 6/2015 | Shen et al. | |
| 2015/0170295 A1 | 6/2015 | Shen et al. | |
| 2015/0206222 A1 | 7/2015 | Bart et al. | |
| 2015/0281162 A1 | 10/2015 | Shen et al. | |
| 2015/0293989 A1 | 10/2015 | Bhargava et al. | |
| 2016/0078353 A1 | 3/2016 | Shen et al. | |
| 2016/0182420 A1 | 6/2016 | Shen et al. | |
| 2016/0182436 A1 | 6/2016 | Suzuki et al. | |
| 2016/0183068 A1 | 6/2016 | Shen et al. | |
| 2016/0191560 A1 | 6/2016 | Pegna et al. | |
| 2017/0147984 A1 | 5/2017 | Zoia et al. | |
| 2017/0221010 A1 | 8/2017 | Brdiczka et al. | |
| 2017/0228696 A1 | 8/2017 | Brdiczka et al. | |
| 2017/0228697 A1 | 8/2017 | Brdiczka et al. | |

OTHER PUBLICATIONS

Preliminary Report on Patentability dated May 18, 2017 for PCT Appln. No. PCT/US15/58684.

Extended European Search Report dated Sep. 8, 2017 for EP Appln. No. 15856574.7.

* cited by examiner

SYSTEM FOR IMPLEMENTING THREAT DETECTION USING THREAT AND RISK ASSESSMENT OF ASSET-ACTOR INTERACTIONS

BACKGROUND

Detecting and ultimately preventing ongoing malicious insider attacks has become a crucial problem for enterprise and government organizations in recent years. Insider threats pertain to the situation when an insider (such as a company employee or contractor) performs malicious activities from within the company firewall. This is in contrast to many types of other threats that involve attacks from external hosts originating from outside the company network.

Malicious insiders often seek to obtain valuable information located at key assets that might comprise of, but not be limited to, trade secrets, intellectual property and private information regarding an organization's customers, employees and associates. In addition, malicious insiders may commit sabotage of key infrastructure that can affect crucial functional aspects of the organization.

Given the extreme levels of damage that may result from malicious activities of an insider, identification of insider threats has become an important goal in the context of network security for many organizations.

However, it is very difficult to effectively detect the presence of an insider threat. By definition, perimeter solutions (firewalls or Intrusion Prevention Systems) are not deployed in a manner that allows them to detect human-driven malicious behaviors originating from inside the network—such systems are typically oriented to the detection of outsider threats. Furthermore, most IT organizations grant hosts inside their networks a very broad set of rights. The definition and detection of anomalous and ultimately malicious behavior is thus much harder. In addition, the volume of traffic moving through modern networks is substantially larger than even in the recent past, making it more difficult to assess whether any particular portion of the data conveyed is malicious, harmful, or corresponds to a security breach or threat.

A large array of sensors installed on hosts would be able to monitor and flag malicious behavior. However, such solutions are invasive, costly and difficult to maintain. These solutions also often operate by attempting to detect a set of known scenarios using pre-programmed rules or heuristics. Therefore, another problem with this approach is that it is impossible to always know ahead of time the specific characteristics of every threat that may be carried out, and hence such systems are always playing "catch up" to the real-world ever evolving threats that may occur.

Another conventional approach is to merely search for access violations. However, this approach cannot routinely solve the insider threat problem due to the insider being by default an authorized user.

A final approach is to implement fine-grained access controls to limit what each insider can access to the narrow definition of the inciderproblem insider problem due to fine-grained access controls will be costly to maintain and will hinder productivity because it may restrict access to assets for legitimate users.

Therefore, there is a need for an improved approach to implement insider threat detections.

SUMMARY

Embodiments of the invention provide an improved approach to implement a system and method for detecting insider threats, by tracking unusual accesses to key assets for a specific user over time. In this way, malicious activity and preparation of breaches and attacks can be identified.

Other additional objects, features, and advantages of the invention are described in the detailed description, figures, and claims.

DETAILED DESCRIPTION

The disclosed invention provides an improved approach to implement a system and method for detecting insider threats. The disclosed invention provides a way to identify abnormal behaviors potentially leading to insider threats without the need for individual monitoring software on each host, by leveraging metadata that describe the internal connection patterns of assets and hosts/actors in the network.

The disclosed invention therefore provides a way to detect unusual access to identified key assets in an organization. This is important as undesirable access to these assets can lead to a compromise of both the value and the security of the organization, its customers, its employees and its associates. The proposed innovation aims at detecting in real-time any unusual activity performed on a key asset by an authorized user as well as to provide a current threat and risk assessment of the interactions between an asset and all actors accessing it.

To perform threat detection according to some embodiments, a predictive model is generated that profiles the normal behavior and data acquisitiveness of entities interacting with a key asset. This estimate of acquisitiveness allows the system to also provide risk assessment of actors with access privileges.

Figure 1:
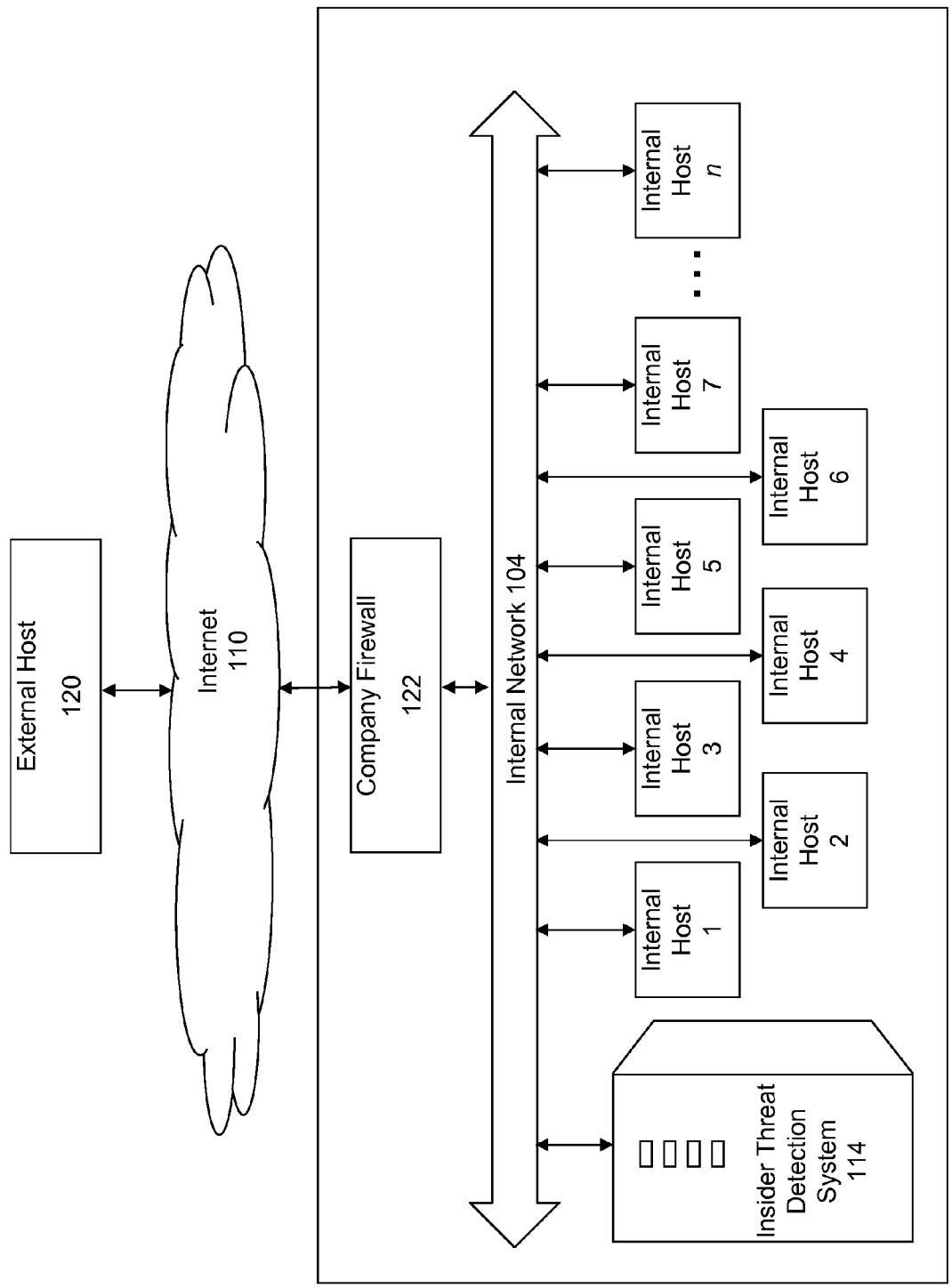
FIG. 1 illustrates how some embodiments of the invention may be implemented in an organization's network.

FIG. 1 illustrates how some embodiments of the invention may be implemented in many organization's networks (also referred to herein without limitation as "company networks"). The internal network infrastructure 104 carries data and communications between multiple points within the company network, including completely internal traffic between and among internal multiple internal hosts, such as internal hosts 1, . . . , n. The company network may cover multiple physical locations or may be limited to a single place like a campus network or a data center. This internal traffic usually sits behind a firewall 122, so that any external traffic is carried through the firewall 122 to the public Internet 110 to communicate with any external hosts 120.

An insider threat detection system 114 is provided to monitor the company network for insider threats. The detection system 114 extracts and maintains metadata across time windows to construct the predictive models and to perform threat analysis. The system 114 compares in (near) real-time each baseline model for an asset relative to behaviors currently monitored. The system can then identify significant deviation in behaviors, and further flag and report them as potential threats.

To operate, the insider threat detection system 114 receives network packets from the internal network infrastructure 104. The insider threat detection system 114 can be implemented as software that resides upon networking equipment within the network 104, such as a router or switch. The insider threat detection system 114 can also be implemented as a dedicated hardware device or can be implemented as software that the company places on hardware of its own choosing either of which monitor network traffic on the network 104.

The insider threat detection system 114 receives packets that are sent within the network, and processes them through a detection algorithm in order to identify and isolate potentially malicious behavior. In some embodiments, the system 114 only monitors internal traffic on network 104 to check for insider threats, and ignores any traffic to/from external hosts 120.

Network packets arrive at the system 114 from, for example, a SPAN (Switched Port ANalyzer) port or a TAP (Test Access Point) port. The system passively accepts traffic from one or more such ports and processes it using a flow engine. The flow engine organizes the received packets into unidirectional flows of traffic from a single source to a single destination, though the destination may be a multicast or broadcast address, thus potentially arriving at multiple recipients. In an IP network (which this system is illustratively though not exclusively concerned with), a flow is minimally identified by at least a source address and destination address. Some protocols (e.g., UDP and TCP) further support the concept of a source port and a destination port, thus leading to the common use of a five tuple that also includes this information (protocol, source port and destination port) to identify a flow.

The insider threat detection system 114 may include a processing engine to process the incoming packets, and to check the network traffic for anomalies worth reporting. A detection algorithm (described in more detail further below) is used to perform these checks. Further details of an example approach that can be taken to implement a processing engine is described in U.S. Provisional Application 61/951,185, filed on Mar. 11, 2014, which is hereby incorporated by reference in its entirety.

Figure 2:
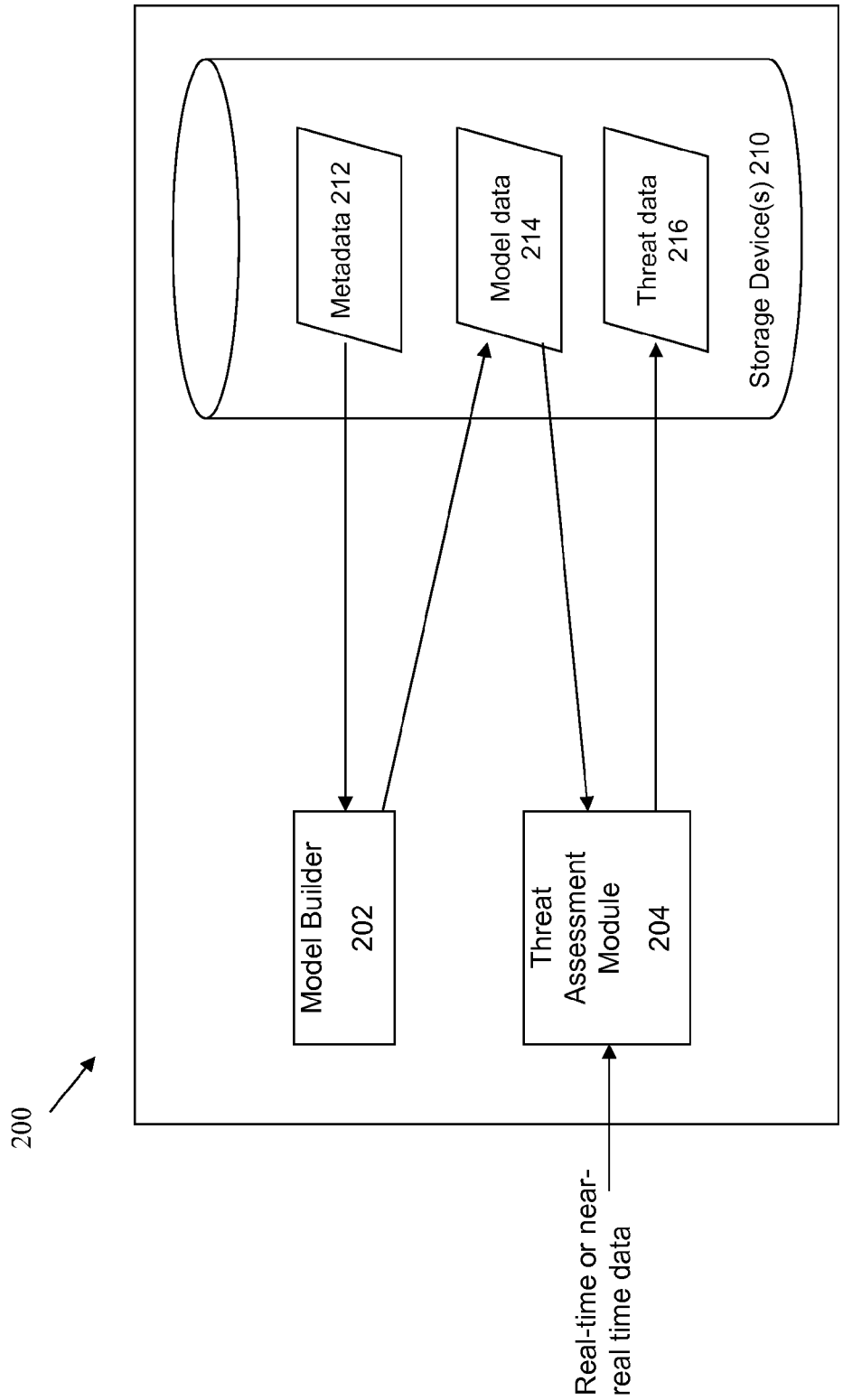
FIG. 2 shows an architecture of the threat detection system according to some embodiments of the invention.

FIG. 2 shows an architecture 200 of the insider threat detection system according to some embodiments of the invention. The system includes a model builder 202 that receives metadata 212 collected from the network traffic, and uses that metadata 212 to construct one or more predictive models 214. In some embodiments, the metadata is a dynamic data set that is refreshed on a regular basis.

A threat assessment model 204 accesses the predictive model data 214, and performs a comparison against the data being collected for ongoing network activity. The threat assessment model 204 identifies any significant deviations in behavior, and flags such behaviors as potential threats.

Detected threats can be stored into a threat database 216. The threat database includes the information about detections of potentially malicious behavior as well as information about the hosts/actors to which those behaviors are attributed. In some embodiments, the captured information may pertain to specific users that are associated to a specific host exhibiting the malicious behavior, if a correlation can be made between individuals/users and the hosts.

The model data 214, metadata 212, and threat data 216 can be stored onto one or more computer readable storage devices 210. The computer readable storage devices 210 comprises any combination of hardware and software that allows for ready access to the data that is located at the computer readable storage device 210. For example, the computer readable storage device 210 could be implemented as computer memory operatively managed by an operating system. The data in the computer readable storage device 210 could also be implemented as database objects, cloud objects, and/or files in a file system. It is noted that the metadata, model data, and threat data do not need to be stored in the same storage device/database or even in a database.

Figure 3:
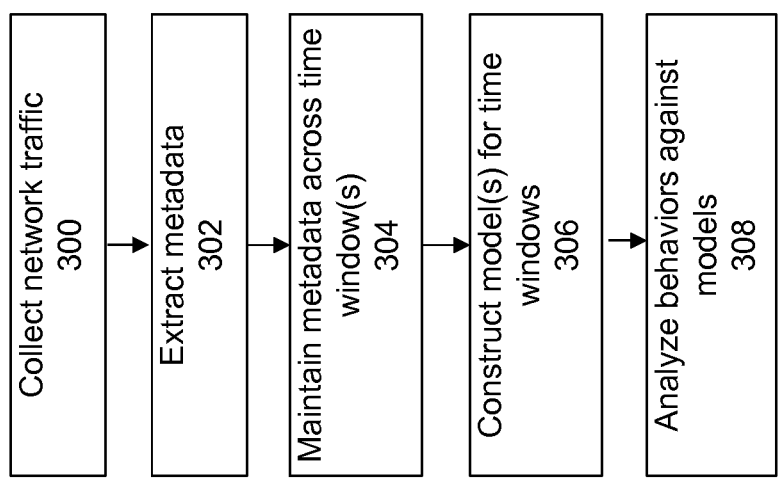
FIG. 3 shows a flowchart of an approach to perform insider threat detection according to some embodiments of the invention.

FIG. 3 shows a flowchart of an approach to perform insider threat detection according to some embodiments of the invention. At 300, the company network is monitored for network traffic. The general idea is that certain patterns of behavior pertinent to an insider threat can be discovered by monitoring current network traffic and comparing it to previously established network traffic baseline models.

In certain embodiments, only internal network traffic needs to be monitored to detect insider threats. Therefore, traffic to/from external locations may not need to be monitored. In some embodiments, the network traffic is only monitored to check for communications between key assets and any hosts/actors in the network. Key assets may correspond to any node, host, or server within the network that may be sensitive in some way or which contains sensitive information. Examples of assets that may be deemed to be more sensitive could include servers containing confidential financial data, source code, legal documents, etc. (as compared to less sensitive servers such as print servers).

At 302, metadata is extracted from the collected network traffic. Each communications session within an organization internal network results in the creation of a set of metadata that contains information including, but not limited to, source and destination host, destination port, number of communication attempts, size of data exchanged, duration and time of the communication.

Next, at 304, the metadata is maintained across time window(s). The metadata and relevant features from sessions of interest are collected, stored and aggregated for time windows of varying lengths including, but not limited to, a single day, a week, and a month.

At 306, predictive models are constructed using the metadata. The predictive models provide a baseline of behavior, such that significant deviations from that baseline can then be used to identify behavior that is "abnormal" enough to be identified as a threat.

At 308, currently monitored behaviors by host/actors in the system are compared against the previously constructed models to identify potential threats. Any threats that are detected are placed into a threat database. In addition, an alert can be provided to appropriate personnel (e.g., system administrators) regarding the threat.

The key to this approach is that the system uses machine learning to determine baseline levels of behavior for hosts within the network over a given time period, and then current network traffic is compared against these established baseline models to check for malicious behavior. This permits the system to correlate the hosts to possibly malicious behavior in a dynamic manner, without requiring excessive levels of monitoring on each host/node.

One of the benefits of the described approach is that the predictive models can be updated to reflect changing conditions in the network. Therefore, information gathered from monitoring the network can be used to update the machine learning models. One possible approach is to use the information gathered from a preceding 24-hour period to create a baseline model that is used for analysis for a subsequent 24-hour period. The information gathered in the subsequent 24-hour period is used to both perform threat detection and to update the previously determined model. Another approach is to implement a sliding overlapping window for the monitoring, where additional monitoring incrementally updates the model.

Figure 4:
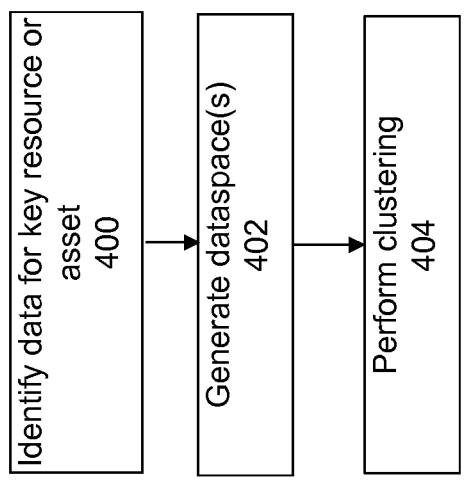
FIG. 4 shows a more detailed flowchart of an approach to construct the predictive models.

FIG. 4 shows a more detailed flowchart of an approach to construct the predictive models. At 400, data associated with key assets/resources is identified. As noted above, key assets may correspond to any node, host, or server within the network that may be sensitive in some way or which contains sensitive information. Examples of assets that may be deemed to be more sensitive could include servers having confidential financial data, source code, legal documents, etc. (as compared to less sensitive servers such as print servers).

At 402, a dataspace model is generated for each set of asset/actor interactions. For a given time period (e.g., 24 hours), the interactions between a specific asset and a specific host/actor are collected and included in the data space model. Any set of dimensions may be represented in the dataspace model. In one embodiment, the features considered include the amount of data sent and received, and can be imagined as being collected in a two-dimensional plane. However, any characteristic that may be indicative or informative of a threat may be used as a dataspace model feature. Additional example characteristics include communications duration, communication attempts, data transfer frequency, data transfer rates, etc. It is clearly possible that a dataspace model has more than two dimensions.

At 404, clustering is performed on the generated dataspace representations. This identifies the sets of data points that should be grouped together into clusters. This action also identifies a center of gravity for the different clusters.

Figure 5A:
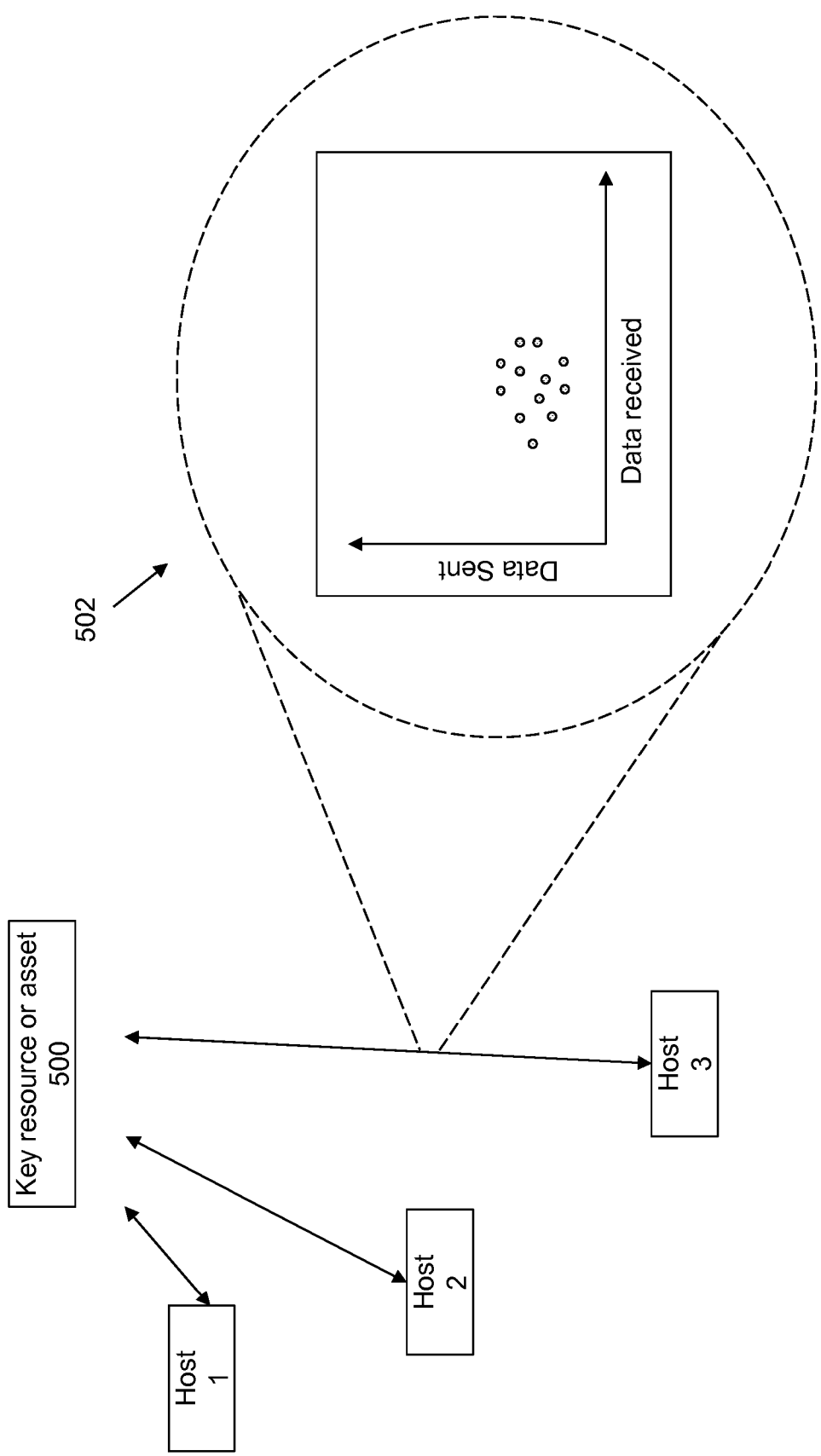
FIGS. 5A and 5B provide an illustrative example of the progressive reconstruction of models and statistical estimators on a regular and methodical basis.
Figure 5B:
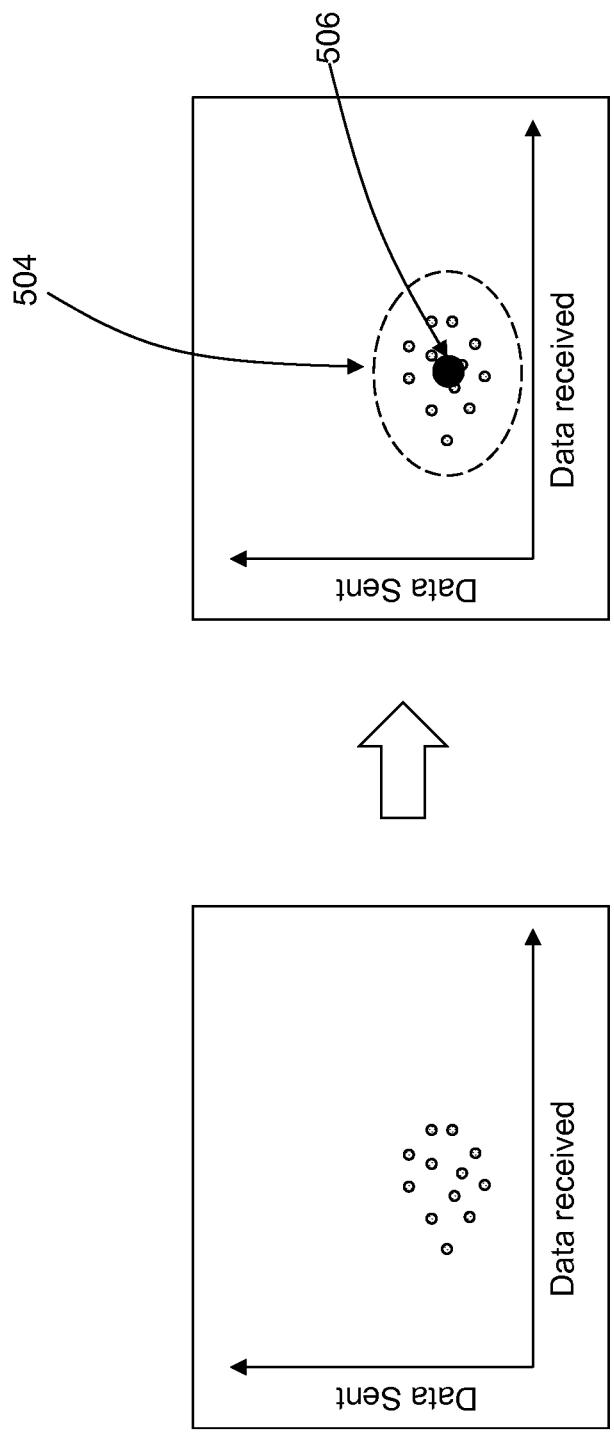

FIGS. 5A and 5B provide an illustrative example of the progressive reconstruction of models and statistical estimators on a regular and methodical basis, using machine learning and statistical methods. This type of learning utilizes incrementally learned models supplemented with new metadata to establish the "data acquisitiveness" of an actor with respect to a key asset. Examples of methods used for this include, but are not limited to, unsupervised learning using ensemble-based estimation over k-means, Gaussian mixture models, and robust statistic estimators such as median absolute deviation. These methods yield parametric estimates of the collected metadata for each actor-asset relationship.

Referring to FIG. 5A, shown is a key asset 500 which has been engaged in communications by various actors, such as Host 1, Host 2, and Host 3. Data is gathered for all of the interactions between these actors (Host 1, Host 2, and Host 3) and the key asset 500 over a period of time. These interactions can be represented in a dataspace feature space, such as, in a simple 2-dimensional feature space, plot 502. Though here a 2-dimensional feature space is discussed as an illustrative example, the same processes can be implemented to represent host interactions in n-dimensions using n-features, such as communications durations, communication attempts, data transfer frequency, data transfer rates, etc.

In this illustrative example of FIG. 5A, plot 502 has a Y axis that represents the quantity of data sent from the actor to the key asset and an X axis that represents the quantity of data received for the same actor from the key asset over multiple periods of observation. Therefore, each interaction between the host of interest (e.g., Host 3) and the key asset (asset 500) is placed as a point within the plot 502 based upon the quantity of data sent and received during that interaction. Over the specified time period represented by plot 502, there may be multiple such interactions, each of which is represented by a plot like 502.

Next, clustering is performed for the points within the dataspace plots. FIG. 5B illustrates that the set of points within the plot can be grouped into one or more clusters 504. A centroid 506 within the cluster can also be identified.

Once the dataspace representations and clusters have been constructed, malicious insider activity within an organization's internal network can be identified by checking for abnormal behavior (feature points in the n-dimensional dataspace) with respect to the baseline model clusters.

Figure 6:
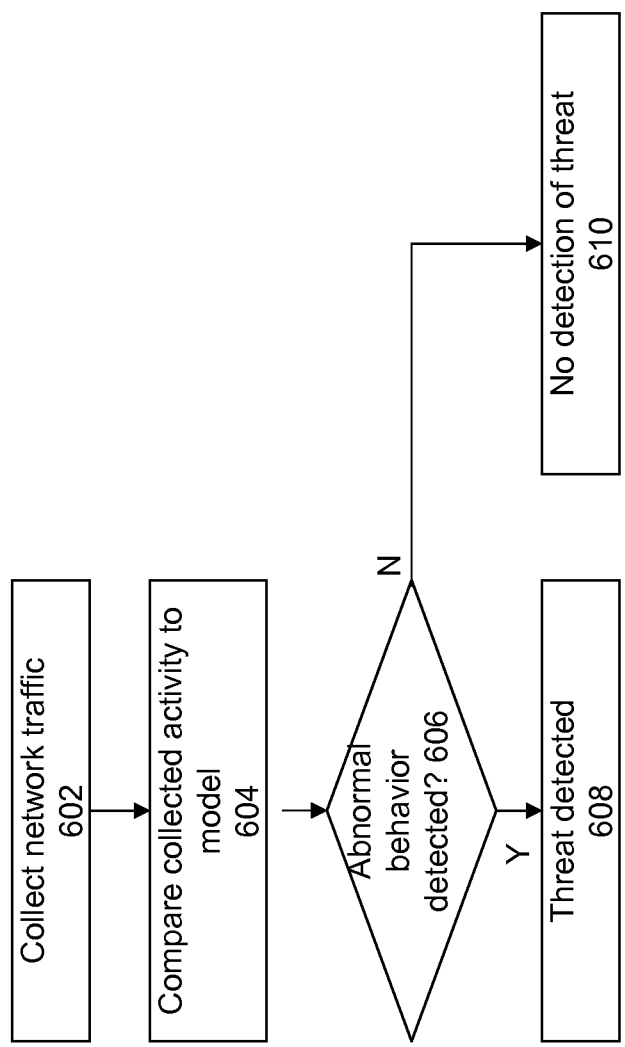
FIG. 6 shows a flowchart of an approach to detect threats using abnormal behavior tracking.

FIG. 6 shows a flowchart of an approach that can be taken to check for this abnormal behavior. At 602, internal network traffic is collected. This data is collected over a time period before, during and after the time period used to construct the earlier baseline model.

At 604, a comparison is made between the data for the newly collected activity and the previous baseline model. A determination is made at 606 whether the data for the newly collected activities indicates abnormal behavior. One or more threshold levels can be established to numerically identify whether the behavior can be classified as being abnormal.

For example, one possible approach that can be taken is to establish a threshold radius surrounding the centroid for each cluster, and to determine whether the newly identified behavior, represented as a feature point in the dataspace, falls within that distance threshold. For a plot that represents the amount of data sent/received between the key asset and an actor, this threshold radius represents a threshold for the amount of data sent and received between the key asset and the actor that is deemed to be so different from the previous baseline as to be worthy of suspicion as malicious activity.

If the analyzed behavior is indicative of an insider threat, then the threat is reported at 608. However, if the analyzed behavior does not correlate to an insider threat, then at 610 the situation does not result in detection of an insider threat.

Therefore, for each length of time window, a series of predictive models are built and the resulting parametric estimates are used as reference metrics to evaluate activity for threat and risk in (near) real-time. These evaluation metrics can include, but are not limited to, z-scores based on variances estimated from mixture models, mean absolute deviation and distance from centroids of clusters. Hence, each model may comprise an estimator function and a parameter set fit to each actor-asset relationship. The parameter set would be the result of a learning process using methods mentioned above. The estimator function would evaluate a series of (near) real-time metadata, representing recent activity, based on the parameters estimated by the learning process. This will result in a quantitative assessment of the activity that can then be combined with estimates from other threat-assessment and behavioral models for instance, the community model. Further details of an example of such a community model is described in U.S.

Provisional Application 62/074,560, filed on Nov. 3, 2014, which is hereby incorporated by reference in its entirety.

Figure 7:
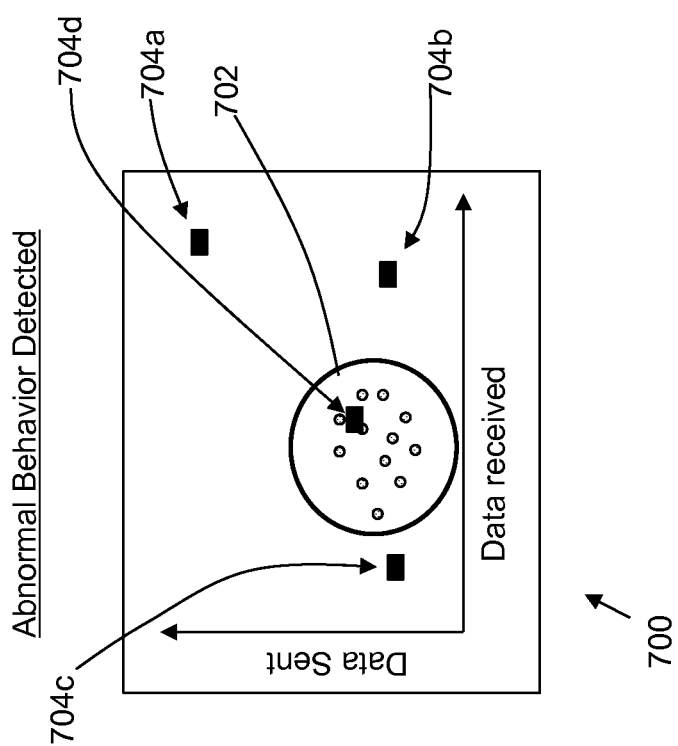
FIG. 7 illustrates an example of abnormal behavior detection.

FIG. 7 provides an illustration of this process. Plot 700 shows a series of points that have been plotted and clustered together. The points in the cluster can represent the complete set of actors-assets interactions, or just a subset of actors selected according to some specific criteria (e.g., focusing only on hosts that are authorized to use an asset, or just the usual behavior for one specific host). A threshold threat radius 702 can then be established for this cluster. If any new activity by an actor represented by points in the graph falls outside of this threshold radius, then it may be considered abnormal behavior sufficient to trigger a threat alert.

Here, a first activity is represented by the symbol 704a. This activity falls outside of the threshold radius 702, since both the "data sent" and "data received" attributes for this activity are high enough to be beyond the threat thresholds that have been set. In this case, the behavior is clearly seen to be abnormal enough such that there is a possibility of this activity being malicious in nature.

A second activity is represented by the symbol 704b. This activity also falls outside of the threshold radius 702, since the "data received" attribute for this activity is high enough to be beyond the threat thresholds that have been set. In this case, the behavior can be seen to be abnormal enough such that there is a possibility of this activity being malicious in nature. This situation is detectable as a threat even though the "data sent" attribute is low enough to be within the baseline behaviors.

A third activity is represented by the symbol 704c. This activity also falls outside of the threshold radius 702. However, in this case, the activity is seen as being abnormal because the detected activity levels are too low relative to the baseline models. Here, the "data received" attribute for this activity is low enough to be beyond the threat threshold radius 702 that has been set. In this case, the behavior consists of insufficient activity and is unlikely to be considered as malicious in nature and thus would not be identified as a threat.

A fourth activity is represented by the symbol 704d. In this case, the "data sent" and "data received" attributes fall within the normal baseline behavior, and it can be seen that that this activity therefore falls directly within of the threshold radius 702. Since both the "data sent" and "data received" attributes for this activity have values that are within the threat threshold radius that has been set, this activity would not be identified as a threat.

The inventive concepts described herein can be used to provide quantitative estimates of threat and risk within a company network. By looking at the baseline activity of the actors in the network relative to key assets, one can determine the possible impacts of behavior by the those actors and the associate extent of risks they pose.

Figure 8:
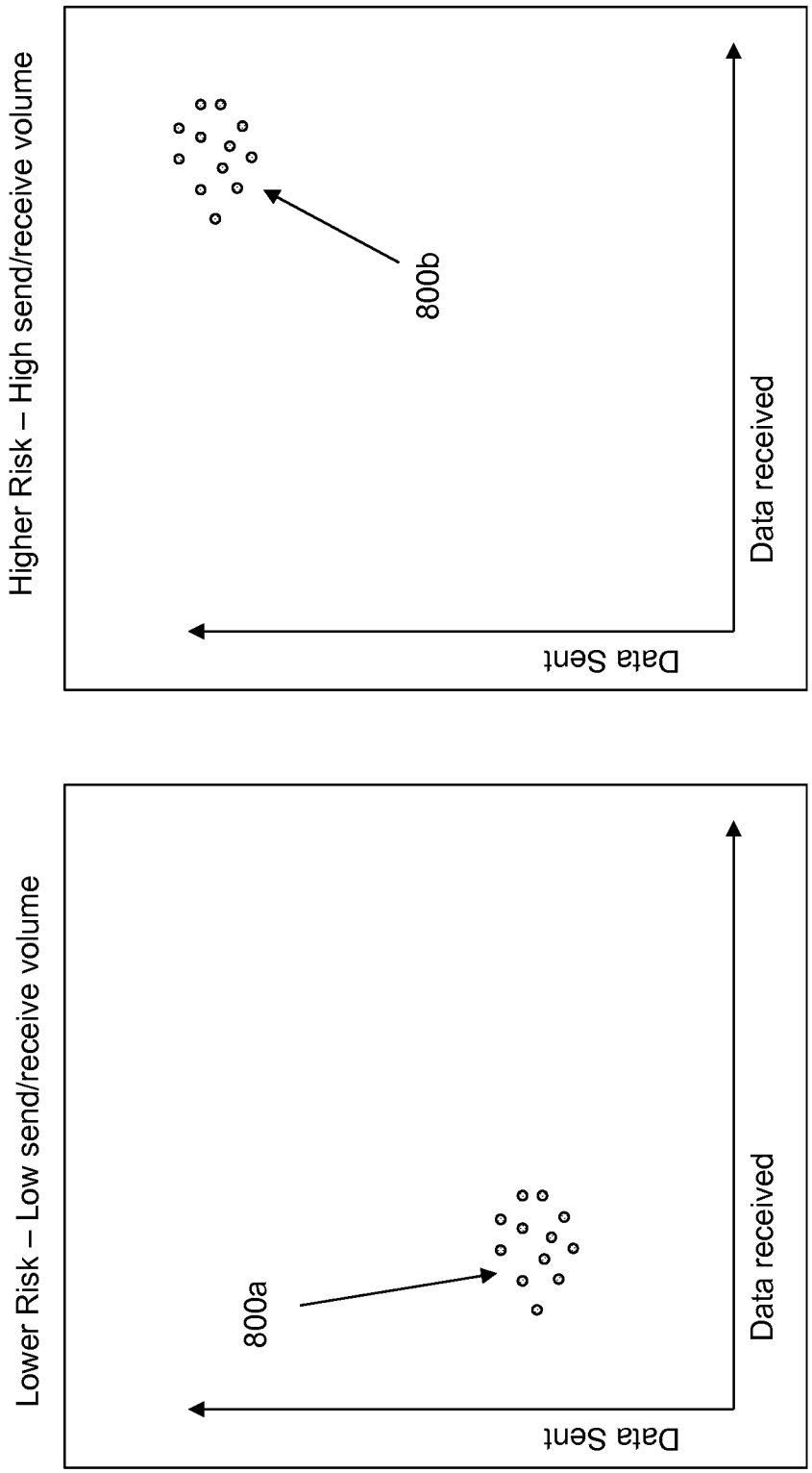
FIG. 8 illustrates an approach to to provide quantitative estimates of threat and risk.

To explain, consider the dataspace plots shown in FIG. 8. Here, the plot on the left shows a cluster 800a and the plot on the right shows a cluster 800b. It can be seen that cluster 800a pertains to data points that correspond to relatively lower levels of data sent and data received. In contrast, the cluster 800b pertains to data points that correspond to relatively higher levels of both data sent and data received. In fact, the activity for the interactions represented by cluster 800b corresponds to significantly higher amounts of data being transferred as compared to cluster 800a.

In this situation, given that the baseline models pertain to a sensitive asset, one can construct a matrix of the data to show that the threat and/or risk of malicious behavior are greater for the cluster 800b than it is for cluster 800a. In this case, the potential risks, and level of impacts from such risks, can clearly be seen as being higher for cluster 800b compared to cluster 800a. This increased level of risk and impact can be quantified by analyzing the relative locations of the clusters and their locations within the feature space representations.

The threat analysis process can be configured to account for the relative levels of risks and impacts from possible threats. This might involve using an extended set of features to evaluate the threshold metrics that determine threat boundaries. For instance, FIG. 8 describes the profile of a given asset, and the threat boundaries for each cluster can be modeled as a circle centered at the respective cluster centers. However, for the cluster in the top right, additional features can be used to determine the threat level of a given point due to the larger volume of data involved. For example, if FIG. 8 was describing a SSH (Secure SHell) server, the download rate can be used to as an additional feature for threat determination.

In some embodiments, the described approach to perform threat detections can be performed in (near) real time. This approach is taken to identify behaviors which can be recognized by looking at multiple sessions over some span of time.

The (near) real-time detection approach perform stateful processing in the sense that they encounter multiple sessions attributed to a specific host in a certain window of time in order to decide whether the collection of sessions is signaling malicious behavior or not.

The (near) real-time processing algorithm processes a session at a time and makes its own decision on whether to ignore the session (because it includes nothing of interest), whether to add to state which it is accumulating for a particular internal host, and/or to report a preliminary detection related to an accumulated set of sessions (which look like they may signal malicious intent) for that host. Each (near) real-time processing algorithm accumulates short-term state as it is looking to detect sustained behavior of a particular kind by a particular host.

Therefore, the method and system described in the disclosed invention provides a way to identify abnormal behaviors potentially leading to insider threats without the need for individual monitoring software on each host, by leveraging metadata that describe the internal connection patterns of assets and hosts/actors in the network.

A predictive model is generated that profiles the normal behavior and data acquisitiveness of entity interactions with a key asset. This estimate of acquisitiveness allows the system to also provide risk assessment of actors with privileges. The disclosed invention therefore provides a way to detect unusual access to identified key assets in an organization. This is of utmost essence as undesirable access to these assets can lead to a compromise of both the value and the security of the organization, its customers, its employees and its associates.

It is noted that the inventive concepts disclosed herein are not limited in their application only to the insider threat scenario. The invention is applicable to any scenario involving a possible threat from a host on an internal network, even if the controlling source of the threat is not an "insider". For example, consider the situation where a machine on an internal network is behaving outside the baseline of its normal behavior, but is doing so at the behest of an outside attacker who has taken over the machine by installing some malware. The above-described detection mechanisms can be used to detect this type of threat, even if it involves an "outsider" rather than an "insider" that operates the host in a malicious manner.

System Architecture Overview

Figure 9:
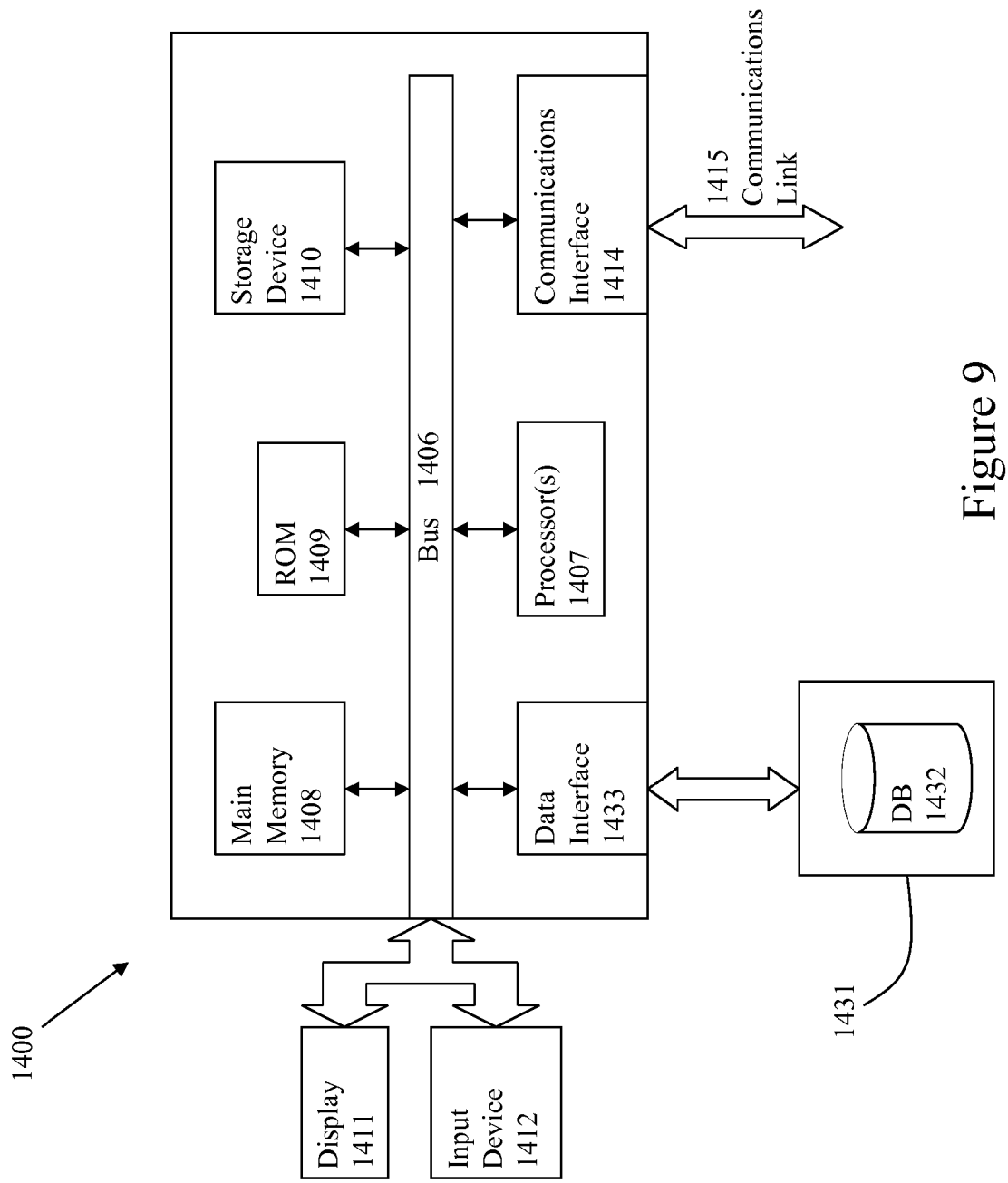
FIG. 9 depicts a computerized system on which an embodiment of the invention can be implemented.

FIG. 9 is a block diagram of an illustrative computing system 1400 suitable for implementing an embodiment of the present invention for performing intrusion detection. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for performing threat detection in a network comprising:
   monitoring, by a network security device, communications traffic in the network; and
   implementing a threat detection system on the network security device, wherein the threat detection system performs the steps of:
      constructing a predictive model using metadata extracted from the communications traffic, wherein the predictive model is constructed by identifying data for a key asset, generating a dataspace representation for the key asset relative to an actor in the network, and clustering data within the dataspace representation, wherein the predictive model is constructed using at least one of ensemble-based estimation over k-means, Gaussian mixture models, or other statistic estimators;
      analyzing behaviors in the network relative to the predictive model; and
      reporting a threat if abnormal behavior is identified.

2. The method of claim 1, wherein the predictive model corresponds to a given time period.

3. The method of claim 1, wherein a threshold threat level is established relative to the predictive model, and activity that falls outside the threshold threat level is identifiable as the threat.

4. The method of claim 3, in which the threshold threat level corresponds to a radius surrounding a centroid of a cluster formed within a dataspace representation.

5. The method of claim 1, wherein evaluation metrics are employed to analyze the behaviors in the network, and the evaluation metrics corresponds to at least one of z-scores based on variances estimated from mixture models, mean absolute deviation, and distance from centroids of clusters.

6. The method of claim 1, further comprising analysis of relative risks and impacts of possible threats.

7. The method of claim 6, wherein a plurality of threshold threat levels are established relative to different predictive models.

8. The method of claim 1, wherein (near) real time monitoring is performed to check for the abnormal behavior.

9. A computer program product embodied on a non-transitory computer readable medium, the non-transitory computer readable medium having stored thereon a sequence of instructions which, when executed by a processor causes the processor to execute a method for performing a process to perform threat detection in a network, the process comprising:
   monitoring, by a network security device, communications traffic in the network;
   constructing a predictive model using metadata extracted from the communications traffic, wherein the predictive model is constructed by identifying data for a key asset, generating a dataspace representation for the key asset relative to an actor in the network, and clustering data within the dataspace representation, wherein the predictive model is constructed using at least one of ensemble-based estimation over k-means, Gaussian mixture models, or other statistic estimators;
   analyzing behaviors in the network relative to the predictive model; and
   reporting a threat if abnormal behavior is identified.

10. The computer program product of claim 9, wherein the predictive model corresponds to a given time period.

11. The computer program product of claim 9, wherein a threshold threat level is established relative to the predictive model, and activity that falls outside the threshold threat level is identifiable as the threat.

12. The computer program product of claim 11, in which the threshold threat level corresponds to a radius surrounding a centroid of a cluster formed within a dataspace plot.

13. The computer program product of claim 9, wherein evaluation metrics are employed analyze the behaviors in the network, and the evaluation metrics corresponds to at least one of z-scores based on variances estimated from mixture models, mean absolute deviation, and distance from centroids of clusters.

14. The computer program product of claim 9, further comprising analysis of relative risks and impacts of possible threats.

15. The computer program product of claim 14, wherein a plurality of threshold threat levels are established relative to different predictive models.

16. The computer program product of claim 9, wherein (near) real time monitoring is performed to check for the abnormal behavior.

17. A system, comprising:
a computer processor to execute a set of program code instructions;
a memory to hold the program code instructions, in which the program code instructions comprises program code to perform:
monitoring, by a network security device, communications traffic in a network;
constructing a predictive model using metadata extracted from the communications traffic, wherein the predictive model is constructed by identifying data for a key asset, generating a dataspace representation for the key asset relative to an actor in the network, and clustering data within the dataspace representation, wherein the predictive model is constructed using at least one of ensemble-based estimation over k-means, Gaussian mixture models, or other statistic estimators;
analyzing behaviors in the network relative to the predictive model; and
reporting a threat if abnormal behavior is identified.

18. The system of claim 17, wherein the predictive model corresponds to a given time period.

19. The system of claim 17, wherein a threshold threat level is established relative to the predictive model, and activity that falls outside the threshold threat level is identifiable as the threat.

20. The system of claim 19, in which the threshold threat level corresponds to a radius surrounding a centroid of a cluster formed within a dataspace plot.

21. The system of claim 17, wherein evaluation metrics are employed analyze the behaviors in the network, and the evaluation metrics corresponds to at least one of z-scores based on variances estimated from mixture models, mean absolute deviation, and distance from centroids of clusters.

22. The system of claim 17, wherein the program code instructions further comprises program code to perform analysis of relative risks and impacts of possible threats.

23. The system of claim 22, wherein a plurality of threshold threat levels are established relative to different predictive models.

24. The system of claim 17, wherein the program code instructions further comprises program code to perform (near) real time monitoring to check for the abnormal behavior.

25. The method of claim 1, wherein the step of monitoring by the network security device further comprises monitoring network packets, the network security device receiving the network packets from a network infrastructure having network equipment.

26. The method of claim 25, wherein the networking equipment comprises a router or a switch.

27. The method of claim 25, wherein the network security device is implemented as software on a dedicated hardware device.

* * * * *